Sept. 18, 1923.
F. M. SUTTON
1,468,179
COMBINED THERMOSTAT AND TIME CONTROL
Filed Feb. 26, 1920    3 Sheets-Sheet 1
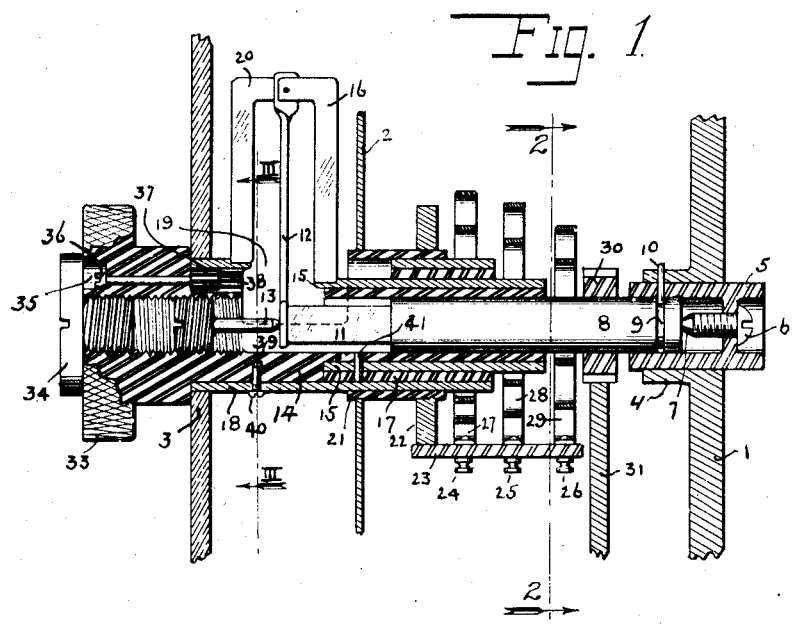
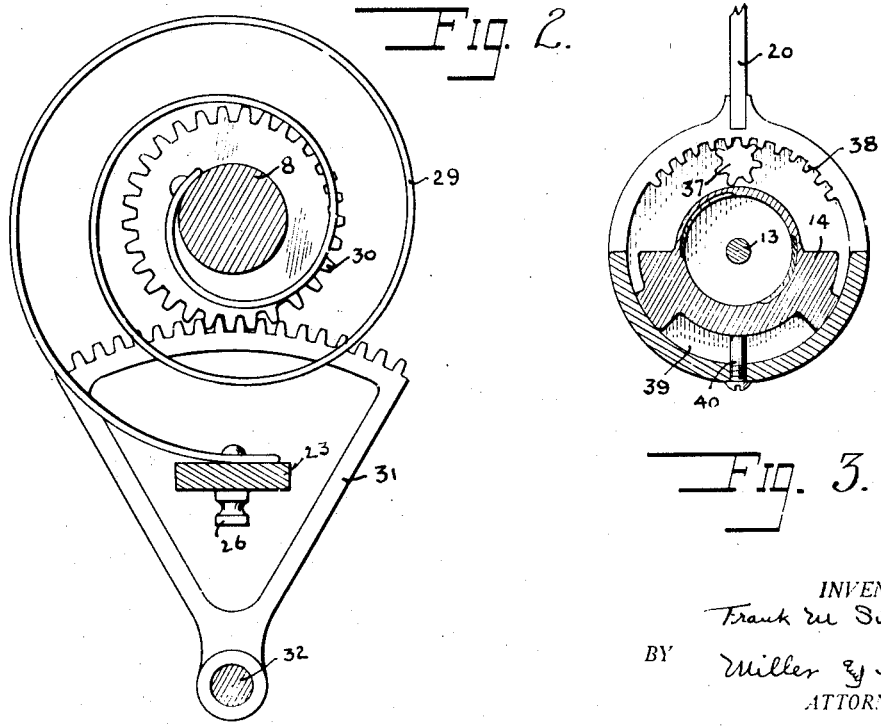
INVENTOR.
Frank M. Sutton
BY Miller & Henry
ATTORNEYS.

Sept. 18, 1923.
F. M. SUTTON
1,468,179
COMBINED THERMOSTAT AND TIME CONTROL
Filed Feb. 26, 1920  3 Sheets-Sheet 2
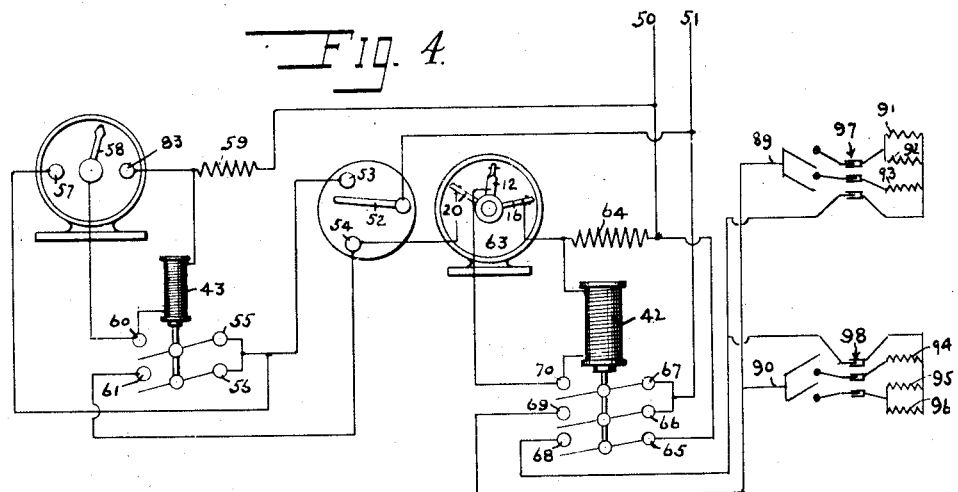
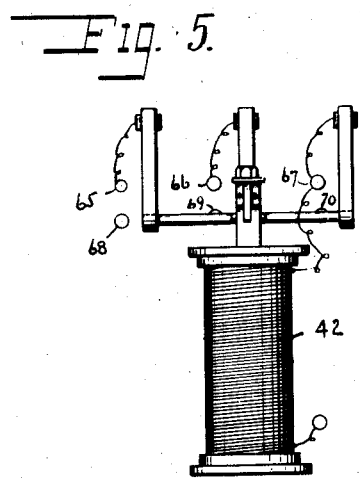
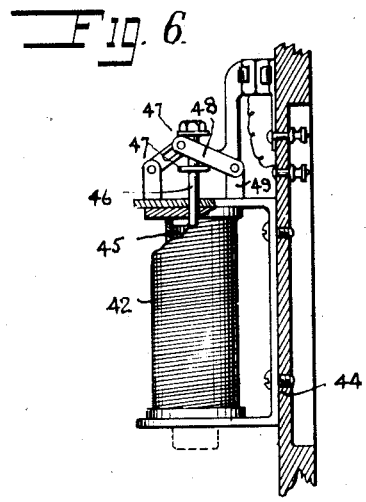
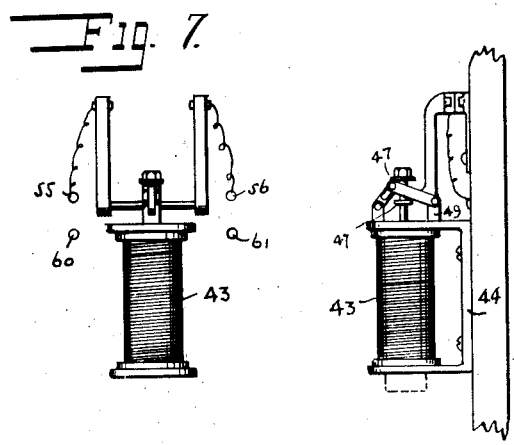
INVENTOR.
Frank M. Sutton
BY Miller & Henry
ATTORNEYS.

Sept. 18, 1923.
F. M. SUTTON
1,468,179
COMBINED THERMOSTAT AND TIME CONTROL
Filed Feb. 26, 1920     3 Sheets-Sheet 3
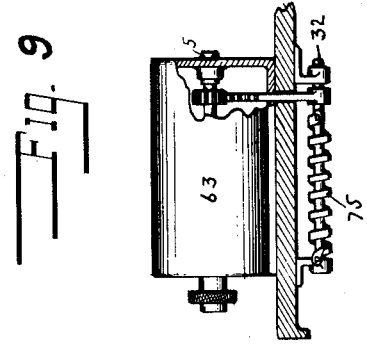
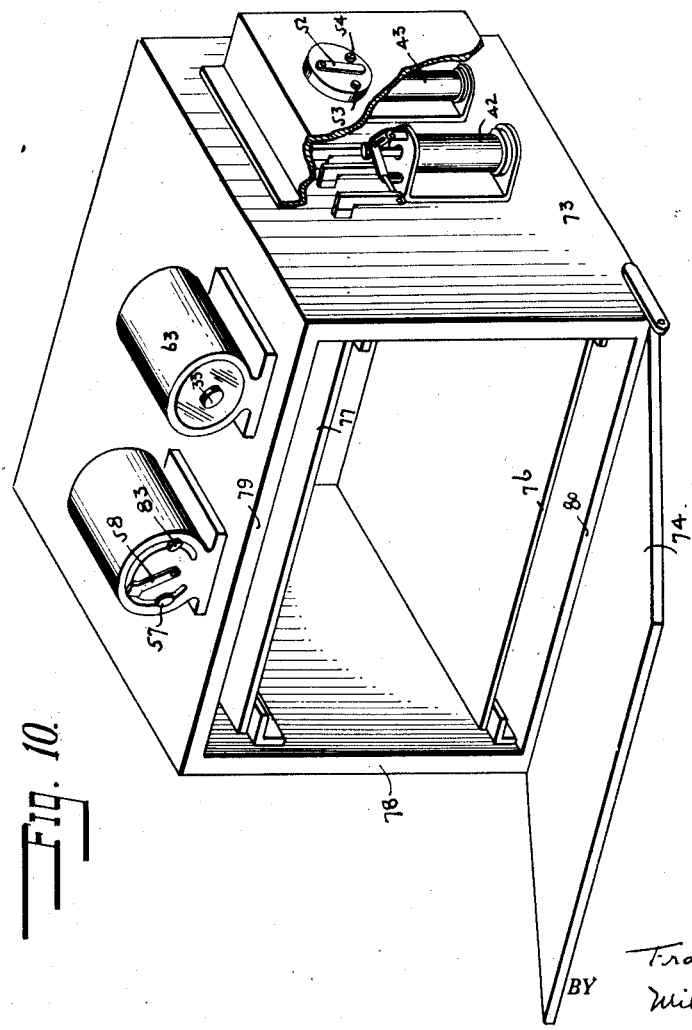
INVENTOR.
Frank M. Sutton
BY Miller & Henry
ATTORNEYS.

Patented Sept. 18, 1923.

1,468,179

UNITED STATES PATENT OFFICE.

FRANK M. SUTTON, OF VALLEJO, CALIFORNIA.

COMBINED THERMOSTAT AND TIME CONTROL.

Application filed February 26, 1920. Serial No. 361,452.

*To all whom it may concern:*

Be it known that I, FRANK M. SUTTON, a citizen of the United States, and a resident of Vallejo, Solano County, State of California, have invented new and useful Improvements in Combined Thermostat and Time Contro's, of which the following is a specification.

My invention has for its object means whereby the temperature control and time of cooking in an oven, or the like, is accomplished, and also whereby any given temperature or temperature range may be retained for an indefinite time, or for a predetermined time, also whereby the period of cooking or heat exposure may be adjusted in advance to start at any particular time and be maintained throughout a predetermined period of time and at a predetermined temperature, and thereafter automatically terminated.

Other objects will appear from the description and drawings.

These objects I accomplish by mounting within the oven one or more heat generating units preferably of an electrical resistance type, and time controlling devices and temperature controlling devices and interconnecting electrical circuits, switches and circuit controlling mechanism actuated by the time and temperature devices whereby a complete automatic control both of time and temperature, or of temperature independent of time may be readily attained, and further providing switch mechanism under the control of the operator whereby one or more heat units may be brought within the automatic control of the time or temperature, or the time and temperature operating mechanism separately, or in combination.

By referring to the accompanying drawings my invention will be made clear.

Fig. 1 shows the thermostat control mechanism in cross section, and is a fragmentary enlarged detail of the interior parts of Fig. 9.

Fig. 2 shows the connections between the thermal control mechanism shaft and the stationary elements, and also the pinion and thermostat quadrant.

Fig. 3 is a detailed view partly in section of the adjusting or setting device for the thermostat mechanism on the line III—III of Fig. 1 and at right angles thereto.

Fig. 4 is a diagrammatic showing of the electrical connections.

Figs. 5, 6, 7 and 8 are parts of the relay switches and operating solenoids.

Fig. 9 is a section through the oven top, of the thermostat and its connections and the control mechanism.

Fig. 10 is a perspective view of the oven with the clock and thermostat control mechanism and relay switches in their assembled position.

Throughout the figures similar numerals refer to identical parts.

Referring first to Fig. 10, the oven is shown somewhat diagrammatically having walls as 73, 78, 79, 80, and a movable door 74. I prefer to heat insulate these walls as also indicated in my copending application, Serial 258,925, filed Oct. 21, 1918, to which reference is herein made.

Within the oven I have shown shelves as 76, 77, and mounted in combination with the open I provide a clock or time mechanism having an arm under time control as 58, and adjustable contact points for the said arm 57, 83 by which the commencement of the oven operating period and the termination of said operation or heat treatment is established and interrupted respectively.

At 63 is shown a thermostat control device which through the operation of the projecting milled head 33 may be adjusted to determine the point at which the energizing heating current will be turned on and be turned off. Further adjustment of this latter are accomplished as by the screw 36, Fig. 1, which will be described in detail below, and also by the switches 89, 90, which are shown diagrammatically only in Fig. 4, and which may be mounted in any location to suit local requirements.

Relay switches are shown at 42, 43 of Fig. 10, which I interpose in the electrical circuit connections and whereby the time control and the thermostat control effect the energization and de-energization of the electrical resistance units for establishing heat within the oven. A plurality of such heat units are shown diagrammatically in Fig. 4 as at 91, 92, 93 and 94, 95, 96, and which are adapted to be plugged into the electric circuit connections as shown diagrammatically at 97, 98, so that any of these heat units may be readily replaced or renewed as occasion may require, and one or more of them energized through the switches 89 or 90, or both of said switches, when the contact points 68, 69 are suitably energized through the relay 42. The switches 89 and 90 are intended to be hand controlled, and the switch lever 52 having contact points 53, 54 is also intended to be hand controlled as well as the setting of the time contacts 57 and 83, and the thermostat contact arms 20 and 16 may be adjusted through the hand adjustment of the milled head 33 and also by the screw head 36.

The temperature of the interior of the oven actuates the thermostat coil, shown diagrammatically at 75, Fig. 9, which may be of any suitable form, of which there are many known in the art; and which, upon a variation in temperature within the oven will rotate the shaft 32 in one direction or the other and thus actuate the quadrant 31 and pinion 30, and therefore actuate shaft 8 of the thermostat mechanism in one direction or the other, depending upon the temperature change.

In detail, the thermostat control of the heating circuit comprises a series of telescoping tubes (see Figs. 1, 2, 3) in which 1 represents the casing or rear wall, 2 the dial and 3 the transparent face plate of said thermostat.

The rear metal wall 1 is provided with a boss which forms a bearing 4 in which is an insulated bushing 5. A screw 6 is threaded in the said bushing, and is provided with a point 7 to form a conical bearing at one end for a metal shaft 8. The shaft 8 is provided with an angular groove 9 which is traversed by pin 10. The shaft 8 has a reduced portion 11' which is formed to receive a metal contact arm 12. The end 11 is conically drilled to form a bearing for a pivot screw 13.

Surrounding the metal shaft 8 is an insulated bushing 14 surrounding which is a metal tube 15, to one end of which is suitably secured a metal arm 16. Surrounding the metal tube 15 is an insulated tube 17, which in turn is surrounded by a metal tube 18 which extends through the dial 2 and terminates on the front line of the face plate 3. The tube 18 is cut away as shown at 19 to permit the partial rotation of the arms 12 and 16.

Suitably secured to the metal tube 18 is a metal arm 20. The arms 16 and 20 are L-shaped at their extremities; and are adapted to overlap on either side the arm 12. All of these arms are provided with platinum contact points which may engage with each other when the arms are contacted to complete electric conductivity therethrough.

Surrounding the tube 18 is an insulated tube 21 which insulates the tube 18 from a bridge 22 which extends transversely through the housing and forms a bearing for the previously described tubular shafts. Suitably secured to the lower edge of said bridge is an insulated plate 23 which carries terminal binding posts 24, 25 and 26.

Secured at one end of the binding post 24 is a spiral spring 27, which is secured at its opposite end to the tube 18. The purpose of this spring is to form a flexible means to conduct the electrical current to the arm 20 as it is rotated.

Secured to the binding post 25 is one end of a spiral spring 28 similar to the spring 27 and secured at its opposite end to a shaft 15. This spring conducts electrical current to the arm 16 while it is being rotated.

Secured to the binding post 26 is one end of a spiral spring 29, the opposite end of which spring is secured to the shaft 8 and conducts electrical current to the arm 12 while it is rotated.

The shaft 8 is rotated by means of an insulated pinion 30 suitably secured to said shaft and in mesh with a segment 31, which is secured to and rotated by a shaft 32 which is part of any conventional thermostat.

In order to form an external means of operating the arms 16 and 20 and to fix a range of operation for the thermostat, the insulated tube 14 extends through and beyond the glass plate 3, and is milled as shown at 33. The center of the tube 14 is internally threaded to receive the screw 13 and also a plug 34. The purpose of this plug is to cover a recess 35 in which is a screw 36 extending toward the face plate 3 and rigidly secured to a pinion 37 which latter meshes with the inner toothed edge 38 of the tube 18.

It will be seen from this construction that, by removing the plug 34 and turning the screw 36, the pinion 37 will cause the arm 20 to rotate with respect to the insulated tube 14, and which tube is provided with a groove 39 extending through a portion of its periphery which engages a screw 40, adapted to prevent the longitudinal movement of said tube, and at the same time allow its rotation.

The tubes 14, 15 and 17 are rigidly connected by an insulated pin 41 to insure their rotation in unison.

The electrical current entering 26 passes through spring 29 through shaft 8 and through the arm 12, thus the current passes down arm 20 along the tube 18 through the spring 27 and to the terminal 24. Also the current passes down 16, 15, thence through spring 28 and to terminal 25.

All the above circuits are thoroughly insulated from each other and the main frame work.

The screw 36 adjusts the arms 16 and 20 closer together or further apart so that the range of temperature may be shorter or greater as desired. The nutted head 33 controls the arms 16, 20 in unison so that the range of temperature can be adjusted from low to high or vice versa,—the range variation having been adjusted by screw 36.

The temperature and time controls for the relays controlling the heating circuit includes a pair of solenoid contactors or relays 42 and 43 (see Figs. 5 and 6) which are alike in every respect except that the former throws a three pole switch, while the latter solenoid operates a two pole switch. Both of said solenoids are secured to an insulated base by U-shaped plates secured as shown at 44 to said insulated plate. The coil of the solenoids surrounds a plunger 45 having a reduced portion 46, upon which are washers 47. The purpose of the washers is to reciprocate vertically one end of a lever 48 pivoted as shown to a boss 49. These levers serve to actuate the contacts for closing the respective circuits. Any other relay or contactor of other design that is of the circuit closing type would be suitable.

It will be seen by this construction that when current is applied to solenoid 42, the three fingers will close the heating circuit.

The wiring for my oven consists of a pair of wires 50 and 51 connected to a suitable source of electric current supply. (See Fig. 4). The wire 51 is connected to a switch lever 52 of a selective switch and is adapted to contact with either terminal 53 or 54. When terminal 53 is engaged the current passes to 55 and 56 of the relay 43. When the relay is in the open circuit position of Fig. 4, the current passes to the clock starting contact 57.

At the scheduled time, when the hand 58 of the clock engages 57, relay 43 becomes energized through resistance 59, which is in series with it, establishing circuit closing contacts 55 and 56, engaging them with contacts 60 and 61.

As soon as these contacts are made, or relay 43 is closed, the energy from 51 flows through 56 establishing a circuit through 60 energizing relay 43 and resistance 59 back to the supply 50. Thereafter the relay will continue to be energized even though the circuit through the clock is broken. When relay 43 is closed, a circuit is established at the same time through the selective switch 52 and contact 61 back to 54 and to the low heat point 20 on the thermostat 63.

The thermostat being cold, arm 12 engages arm 20 and a circuit is established through relay 42, and passes out through resistance 64 back to the supply 50; by this means this relay 42 becomes energized, and contacts 65, 66, 67 are established through 68, 69, 70, and the circuit is established through the relay and out through its resistance 64 back to the wire 50. Thus a duplicate circuit is established which leaves the thermostat arm 12 free to move from the low heat position without breaking the relay circuit. At the same time 66 engages 69, and 65 engages 68 and the circuit is established through the heat units of the oven as follows:

In the drawing Fig. 4 it is assumed that there are two groups of three heat units each, which correspond with the showing of the heat units and 3-way blocks by which they are connected in the oven of my copending application, Serial No. 258,925, filed October 21, 1918, and to which reference is herein made.

These several resistances for heating the oven I have shown as also under the control of selective switches, whereby one or more of the units of either of these groups may be cut in or out at the will of the operator.

It will be seen that the circuit established by the relay 42, and flowing through the terminals 68, 69 energizes the selective switches 89, 90, and thereby energizes one or more of the resistance or heating units 91, 92, 93, 94, 95, 96, according as the selective switches 89 and 90 may be set by the operator, the return circuit being to the terminal 69 from the parallel connection on the said resistance units. The two batteries of 3-way plugs are shown at 97 and 98, through which the connections may advantageously be made.

The thermostat arm 12 can now disengage from 20 without breaking the circuit and no arcing will take place. As the thermostat is actuated by heat, the point 12 engages arm 16 at the predetermined point of higher temperature and a momentary rush of current takes place through the resistance 64, which has sufficient capacity to carry full line voltage from 50 to 51, thus short circuiting the relay and disengaging the contacts 65, 66, 67 from 64, 68, 69, 70. As the oven cools, arm 12 disengages point 16, and as the circuit was previously broken by the relay 42, the points will not arc.

The stored heat is maintained in the oven from the units 91, 92, 93, 94, 95, 96 for a considerable time, and as the oven cools to the lowest predetermined degree arm 12 again engages 20 and the heating operation is repeated. This cycle of operations continues until the hand of the clock reaches point 83 on the dial when the momentary short circuit takes place through the resistance 59 and the relay 43 becomes demagnetized and the circuit 55, 56 opened from 60, 61, thus the thermostat circuit is opened and cannot cause the relay 42 to become energized, and the oven then cooks on stored heat. If, however, 42 was energized at the time the clock arm 58 contacts with 83, the circuit will be retained through the heat elements as 91 to 96 as before, and until the thermostat arm 12 contacts with 16, thus bringing the oven to its maximum temperature regardless of the clock, before the interruption of the heat element circuit is established by the breaking of relay 42, which, as before stated, takes place when the thermostat arm 12 contacts at 16. This only occurs when the oven has reached the desired temperature, and if now the clock arm 58 is in contact with terminal 83, which may be made suitably to cover the necessary time interval of energization of the heat units, the circuit will not only be interrupted through the relay 42, but it will not be thereafter re-established when the thermostat arm 12 contacts at 20, because of the opening of the thermostat circuit by the relay 43. The oven will thus have been retained at the desired temperature during the necessary time interval predetermined by the range of clock control and at a temperature predetermined by the thermostat control.

It will be especially noted that when the clock intercepts the thermostat, if the oven is being heated, this operation is continued undisturbed until the maximum heat is reached before the current is shut off from the heating elements. Thus the heating process can only be intercepted at the end of a thermostat cycle or when the thermostat circuit is open, which is advantageous in that the oven and contents are at all times brought up to the highest specified point of heat before the current is shut off.

If it is desirable to operate the oven without using the clock, the switch 52 is turned to contact with 54 and current from the wire 51 will pass through the points 52, 54 to 20 on the thermostat and the cycle of heating operations will continue indefinitely without reference to the clock.

It will be seen that the contacts on the clock and the contacts on the thermostat are movable pivotally to effect a predetermined range of time and temperature operation, and that on the clock the points are independently movable, while on the thermostat they move in unison, the interval between them being predetermined by the adjustment of the screw 36 and preferably depending upon the time interval required for bringing the oven up to the requisite temperature, and means are provided for establishing any relative position of the said points and over any range.

I claim:

1. In thermostat controlled mechanism, a pair of adjustable arms carrying contacts, and a member therebetween adapted to complete a different electric circuit through each of said arms, and means actuated by temperature differences and controlling the movement of the member whereby one of the circuits is established at a temperature corresponding with the adjustment of one of the arms and when contacting therewith and whereby the other circuit is established upon the contacting of the other arm by the member.

2. In thermostat controlled mechanism, a thermostat actuating an arm, adjustable contacts positioned in line with the movement of the arm whereby a circuit is established by one of the contacts and the arm at one limit of a temperature range and another circuit is established by the other contact and the arm at the other limit of the temperature range, and means whereby the two contacts may be adjusted independently, and means whereby they may be moved in synchronism to vary their positions with respect to the arm.

3. In thermostat controlled mechanism, a thermostat actuating an arm, adjustable contacts positioned in line with the movement of the arm whereby a circuit is established by one of the contacts and the arm at one limit of a temperature range, the arms and contacts movable about a common center and relatively insulated.

4. In thermostat controlled mechanism, a thermostat actuating an arm, adjustable contacts positioned in line with the movement of the arm whereby a circuit is established by one of the contacts and the arm at one limit of a temperature range and another circuit is established by the other contact and the arm at the other limit of the temperature range, and means whereby the two contacts may be adjusted independently, and means whereby they may be moved in synchronism to vary their positions with respect to the arm, the arm and contacts movable about a common center and relatively insulated.

5. In control mechanism for an electric oven or the like, time controlled means establishing a relay circuit, a relay actuated circuit and devices retaining the relay energization until the time means establishes a second circuit, and switch means and circuit means constructed and adapted to energize the oven during the relay energization.

In testimony whereof, I have hereunto set my hand at San Francisco, California, this 21st day of February, 1920.

FRANK M. SUTTON.